United States Patent [19]

Landis

[11] 4,328,527
[45] May 4, 1982

[54] SELECTIVE ULTRAVIOLET SIGNAL AMPLIFIER CIRCUIT

[75] Inventor: William R. Landis, Bloomington, Minn.

[73] Assignee: Honeywell Inc., Minneapolis, Minn.

[21] Appl. No.: 199,898

[22] Filed: Oct. 23, 1980

[51] Int. Cl.³ .............................................. H01H 47/24
[52] U.S. Cl. ...................................... 361/175; 340/578
[58] Field of Search ......................... 361/175, 188, 170; 340/577, 578, 579; 250/372

[56] References Cited

U.S. PATENT DOCUMENTS

| | | | |
|---|---|---|---|
| 3,336,479 | 8/1967 | Blackett | 340/578 X |
| 3,462,652 | 8/1969 | Smith | 361/175 |
| 3,683,372 | 8/1972 | Horn | 340/578 X |

Primary Examiner—Harry E. Moose, Jr.
Attorney, Agent, or Firm—Alfred N. Feldman

[57] ABSTRACT

A flame detection circuit means that is responsive to an ultraviolet responsive tube is provided with a safety circuit. The safety circuit encompasses a pulse responsive circuit that is responsive to the characteristic conduction pattern of an ultraviolet responsive type of tube and will not respond to a shunt resistance. The circuit relies on the normal conductivity of a shorting field effect transistor that must be gated into a nonconductive state for an output means to be activated.

5 Claims, 3 Drawing Figures

SELECTIVE ULTRAVIOLET SIGNAL AMPLIFIER CIRCUIT

BACKGROUND OF THE INVENTION

Ultraviolet type of flame detection equipment has been used for many years in various applications. One widely used application is in the detection of a flame in a burner with the detection equipment insuring proper and safe operation of the burner equipment. Ultraviolet flame detection equipment typically relies on a gas filled tube that has a potential impressed across the tube. In the presence of an ultraviolet source, the tube becomes conductive and allows current to be conducted. Circuits of this type typically use an ultraviolet responsive tube that is allowed to conduct, and is then quenched by the application of the alternating current potential. Circuits utilizing this equipment have typically been designed so that a short circuit of the tube causes an output signal which is not responded to as is a tube response to the presence of an ultraviolet source, such as a flame. Typically a short circuit causes equal conduction in both directions of an alternating current while the ultraviolet responsive tube normally conducts only during all or part of one half of the cycle of the applied alternating current potential. It was originally thought that this type of circuit was immune to a low resistance short circuit.

Inadvertently it was found that a relatively low resistance shunt could develop across an ultraviolet responsive tube if moisture was present across the tube leads. This type of failure occurs very rarely, but can create an unsafe condition in equipment that is designed for safe operation of burners and other types of devices that rely on an ultraviolet responsive tube for flame detection. The presence of a moisture condition across the leads of an ultraviolet responsive tube tended to provide a resistance value in the range of 7,000 to 60,000 ohms and is a rare type of failure. Even so, the possibility of this type of a failure is highly undesirable.

SUMMARY OF THE INVENTION

The present invention is directed to the adaptation of an existing flame detection circuit means to make the circuit immune from failures caused by the presence of a relatively low resistance across tube leads. The present invention is directed to the concept of shorting out the output amplifier of a flame detection circuit means until a signal is received from the ultraviolet responsive tube that is not only of the proper magnitude in voltage, but is shaped to be characteristic of a voltage breakdown in the ultraviolet responsive tube that indicates flame. This voltage breakdown is characteristically different than the voltage that would appear across a tube in the event that the tube was shunted by a resistance of say, 7,000 to 60,000 ohms. By providing a short across the input of the output amplifier of the flame detection circuit means it is possible to cause that circuit to be inoperative unless, and until, the signal being generated as indicative of the presence of a flame has a pulse configuration of a particular shape.

It has been noted that when an ultraviolet responsive tube breaks down and conducts in the presence of a flame or other ultraviolet source, the conduction starts with a sharp rise in current and then follows the balance of the alternating current potential wave shape. This sudden breakdown characteristic is distinctly different than the sinusoidal wave shape that would occur if the tube was shunted by a resistance. A circuit has been disclosed that is responsive to the sudden pulse or current flow in the ultraviolet responsive tube, and this circuit removes the short circuit that has been placed across the amplifier for the flame detection circuit means. This mode of operating a flame detection circuit means of the ultraviolet responsive tube type makes the device substantially immune to a resistive type of short and improves the safety and reliability of the flame detection circuit means.

DESCRIPTION OF THE PREFERRED EMBODIMENT

Figure 1:
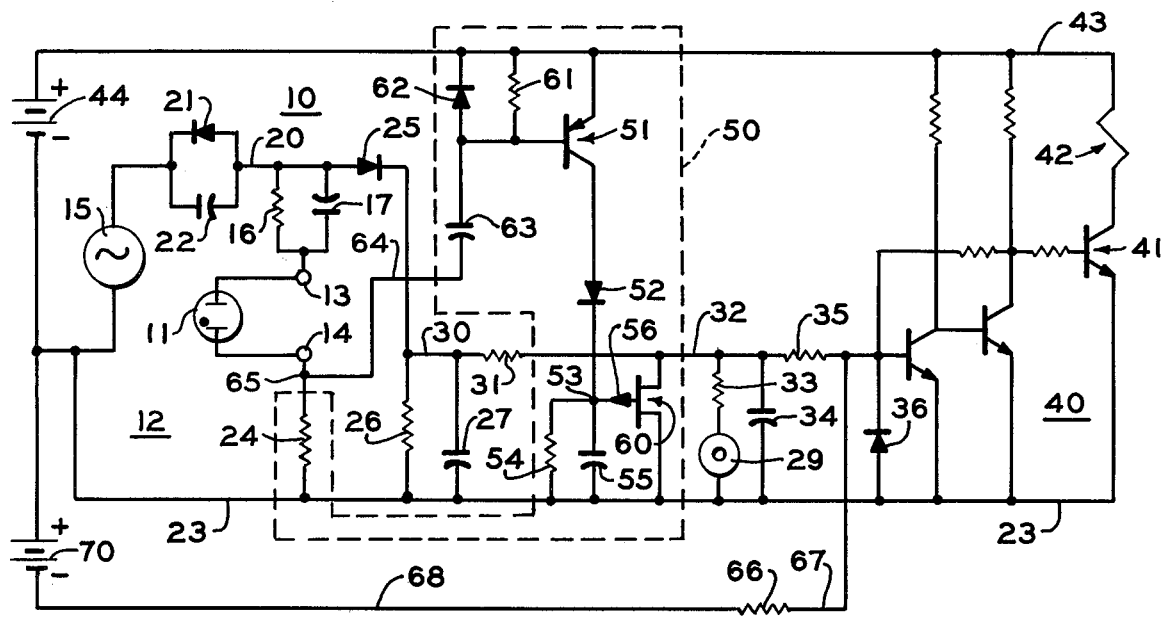
FIG. 1 is a schematic diagram of a flame detection circuit means connected to an ultraviolet responsive tube.

In FIG. 1 there is disclosed a flame detection circuit means 10 which is adapted to be connected to an ultraviolet responsive tube 11 that is positioned to detect a flame. The system disclosed typically would be used in a burner control system for safe operation of a burner. The present system could also be used where a system has been developed for the use of an ultraviolet responsive tube for uncontrolled fires, such as fire alarm and control systems.

The ultraviolet responsive tube 11 is connected to an input circuit means generally disclosed at 12 having a pair of terminals 13 and 14 which are adapted to be connected to the ultraviolet tube 11 with the input circuit means 12 powered by an alternating current potential source means 15. This source means typically would be a 60 hertz source of proper voltage to function with the particular tube 11. The input circuit means 12 further includes a parallel combination of a resistor 16 and a capacitor 17 that are in turn connected by conductor 20 to a parallel combination of a diode 21 and a second capacitor 22. The parallel combination of the diode 21 and capacitor 22 are connected to the potential source means 15 and to a conductor 23 that forms a common or ground for the overall system. The tube 11 is in series with a resistor 24. The capacitors 22 and 17 along with the resistances 16, 24, and the diode 21 form a series circuit which provides for a cyclic charging and discharging of the capacitor means. The charging and discharging of the capacitor means varies dependent on the state of conduction of the tube 11 and will be discussed subsequently.

A diode 25 is connected to a resistor 26 that is paralleled by a capacitor 27 with the diode 25 connected to the input circuit means 12. The parallel combination of the resistor 26 and the capacitor 27 act as an integrating means. The integrating means made up of the resistor 26 and the capacitor 27 has a conductor 30 at which point a signal voltage is developed dependent on the state of conduction of the tube 11. The signal voltage on conductor 30 is fed through a resistor 31 to a further conductor 32. The conductor 32 is connected to a resistor 33 and a flame current meter jack 29 along with a capacitor 34, which are in parallel, to the common conductor 23. The parallel combination of the resistor 33 (including jack 29) and the capacitor 34 is connected through a further resistor 35 to a diode 36 that forms an input to a three stage transistor amplifier generally disclosed at 40. The output of the transistor amplifier or flame amplifier means 40 is a transistor 41 that is connected in series with a switch means 42. The switch means 42 has been specifically disclosed as a relay that is connected between a supply conductor 43 and the transistor 41 which in turn is connected to the ground conductor 23. The conduction of the transistor 41 in response to a signal across the diode 36 controls the pull in and drop out of the switch means or relay 42 provided the conductor 43 is energized from a source, such as a direct current potential 44 that has been shown as a conventional battery. In reality the source 44 would be a potential developed through rectification and voltage regulation from an alternating current source that can be common to source means 15.

To this point, the circuit described is the type of circuit mentioned in the Background of the Invention as an ultraviolet responsive tube flame detection circuit means that is not protected from the inadvertent presence of a resistance across the terminals 13 and 14. The circuitry added to the flame detection circuit means described to this point constitutes the recognition of the problem involved and a means of providing a flame detection circuit means that is immune from resistance shorts across the terminals 13 and 14.

A pulse responsive circuit means is disclosed at 50 that provides for the novel function. The pulse responsive circuit means 50 includes a transistor 51 that is connected from the conductor 43 through a diode 52 to a junction point 53 of a resistor 54 and a capacitor 55. The junction point 53 is connected to a gate 56 of a field effect transistor generally disclosed at 60 and which contains a source and a drain connected so that the field effect transistor 60 short circuits the resistor 33. This short circuit eliminates the signal voltage present on the conductor 32 unless the field effect transistor 60 can be driven out of conduction by a voltage at 53 on its gate 56. This requires the presence of a charge on the capacitor 55 which is provided when the transistor 51 properly conducts through the diode 52.

The transistor 51 has its base connected by a resistor 61 to the source voltage on conductor 43 and the resistor 61 is paralleled by a diode 62. The diode 62 is connected through a capacitor 63 via a conductor 64 to a junction 65. The voltage at junction 65 is the voltage that is generated across the resistor 24 and is indicative of the state of conduction of the tube 11. This will be brought out in the description below in connection with FIGS. 2 and 3. The circuit is completed by connecting a resistor 66 to amplifier means 40 through conductor 67 along with conductor 68 to a further direct current potential 70. This provides a negative bias on amplifier means 40 that must be overcome by the flame signal current to switch the relay 42.

If it is first assumed that there is no flame present, the application of voltage to the present system does not allow for the relay 42 to become conductive. With no flame present, the tube 11 is a substantially open circuit and therefore the input circuit means 12 does not provide a source of potential across the resistor 24. There is a voltage developed across the capacitor 63 which is developed by the direct current potential source 44 charging the capacitor 63 through the resistor 61 and back through the resistor 24. With the tube 11 in a nonconductive state, there is no signal on the conductor 30, but even if there were, the field effect transistor 60, being in a conductive state, would short that signal out.

Figure 2:
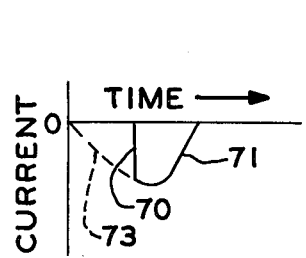
FIG. 2 is a wave form of time versus current in a resistor in the circuit of FIG. 1.

In the event that a flame is positioned to cause the tube 11 to conduct, the conduction of that tube would generate a current in the resistor 24 as is shown in FIG. 2. A current does not occur during the positive half of the applied wave form generated by the source 15, nor does it occur until the tube 11 is supplied with a sufficiently negative potential across the terminals 13 and 14 for the tube to breakdown and suddenly conduct. This is shown by the sharp change in current at time 70. The current then continues to conduct at 71 until the current reaches the zero line at which time the tube 11 is caused to become nonconductive by the normal configuration of its connection in the input circuit means 12. The sudden conduction of current in resistor 24 at time 70 changes the voltage that has been built up across the capacitor 63 and this sudden change in voltage at the capacitor 63 causes the transistor 51 to be suddenly driven into conduction. The sudden conduction of a transistor 51 provides a pulse of current as disclosed at 72 (of FIG. 3) to the junction 53 of the capacitor 55 and the gate 56 of the field effect transistor 60. The circuit is designed so that a small number of pulses are required to raise the voltage across capacitor 55 at the gate 56 of the field effect transistor 60 to turn the transistor 60 "off". At this same period of time the pulses of "on" and "off" being generated are being supplied at the output diode 25 as an input or signal voltage on conductor 30 to charge the capacitor 27 which forms the control signal for the transistor amplifier means 40. It is obvious that when a voltage is provided on the conductor 30 and the field effect transistor 60 is driven out of conduction, that the voltage on conductor 30 then becomes a driving signal for the transistor amplifier means 40 which in turn turns "on" the transistor 41 to pull in the switch means 42 indicating the presence of a flame at the tube 11 as soon as the negative bias set through resistor 66 has been overcome.

Figure 3:
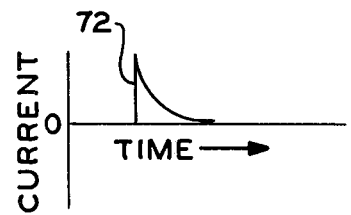
FIG. 3 is a wave shape of the current versus time when a proper current wave form is present.

It will be understood that the wave forms disclosed in FIGS. 2 and 3 must occur for a repetitive number of cycles in order to charge the capacitors 27 and 55 to provide an appropriate signal to the transistor amplifier means 40 to energize the output switch means 42. This eliminates the possibility of a transient or stray type of signal accidentally energizing the control switch means 42.

If the circuit is considered with a resistance across the terminals 13 and 14, it will found that the signal that appears across the resistor 24 is that disclosed in FIG. 2 at 73. In this case the sharp leading edge is not present, and the necessary pulse of current 72 (disclosed in FIG. 3) is not allowed to pass by the transistor 51. The presence of a resistance across the terminals 13 and 14 of the present circuit therefore is properly detected and rejected as an unsafe condition without pulling in the control switch means 42 as had occurred in the circuit prior to the addition of the present invention.

The present disclosure teaches a simple expedient for protecting a circuit against a false indication of flame by the simple addition of a pulse responsive circuit means. The particular type of pulse responsive circuit means is not critical, and it is quite obvious that when this teaching becomes known, that other circuit modifications would become obvious to one skilled in the art. For that reason, the applicant wishes to become limited in the scope of his invention solely by the scope of the appended claims.

The embodiments of the invention in which an exclusive property or right is claimed are defined as follows:

1. A flame detection circuit means adapted to be connected to an ultraviolet responsive tube positioned to detect a flame, including: input circuit means having terminals adapted to be connected to said ultraviolet responsive tube with said input circuit means powered by an alternating current potential source means; said input circuit means further including capacitor means and impedance means in series circuit with said terminals and said alternating current source means to provide a current for cyclically charging and discharging said capacitor means when said ultraviolet tube is exposed to said flame; said ultraviolet tube conducting with a characteristic pulse pattern including a sharp change in current flow through said tube when flame is present; integrating means connected to an output of said input circuit means to integrate a portion of said current to thereby provide a signal voltage when said tube is exposed to said flame; flame amplifier means having an input connected to said integrating means and an amplifier output to control switch means in response to the presence or absence of said flame; pulse responsive circuit means having an input connected to said input circuit means, and an output including normally conductive switch means connected to said flame amplifier input means to short circuit said signal voltage at said amplifier means to thereby control said amplifier means; said pulse responsive circuit means being responsive to said ultraviolet tube conduction characteristic to switch said normally conductive switch means to a nonconductive state upon the presence of said flame at said ultraviolet tube.

2. A flame detection circuit means as described in claim 1 wherein said flame amplifier output switch means includes transistor amplifier means controlling a relay.

3. A flame detection circuit means as described in claim 2 wherein said pulse responsive circuit output switch means which is normally conductive is a field effect transistor; said field effect transistor having source and drain means connected to short circuit said signal voltage; and said field effect transistor having a control gate.

4. A flame detection circuit means as described in claim 3 wherein said pulse responsive means includes a further transistor in series with a capacitor with said capacitor connected to said gate to control said field effect transistor; said further transistor switching in response to said tube conducting in the presence of said flame to provide a charge on said capacitor to cause said field effect transistor to become nonconductive.

5. A flame detection circuit means as described in claim 4 wherein said further transistor has a base electrode coupled to said input circuit means by a further capacitor to control said further transistor in response to said tube conducting in the presence of said flame.

* * * * *